United States Patent [19]

Blum

[11] Patent Number: 4,648,315

[45] Date of Patent: Mar. 10, 1987

[54] DEVICE FOR TEMPERING CHOCOLATE MASSES AND THE LIKE

[75] Inventor: Günter Blum, Quickborn, Fed. Rep. of Germany

[73] Assignee: Blum & Co., Maschinen- und Apparatebau GmbH, Kaltenkirchen, Fed. Rep. of Germany

[21] Appl. No.: 799,488

[22] Filed: Nov. 19, 1985

[51] Int. Cl.[4] .......................... A23C 3/04; F25C 1/14
[52] U.S. Cl. ...................................... 99/455; 62/354; 99/517; 165/94
[58] Field of Search ................. 99/452, 455, 460, 462, 99/470, 484; 426/519, 524, 660, 631; 15/246.5, 93; 62/354, 353, 381, 342, 343; 165/94, 95; 210/396

[56] References Cited

U.S. PATENT DOCUMENTS

| | | | |
|---|---|---|---|
| 1,375,210 | 4/1921 | Clayton et al. | 165/94 |
| 2,677,942 | 5/1954 | Schott et al. | 99/455 |
| 3,770,252 | 11/1973 | Gordini et al. | 165/94 X |
| 4,059,047 | 11/1977 | Sollich | 99/455 |
| 4,279,295 | 7/1981 | Duckworth | 165/94 |
| 4,558,733 | 12/1985 | Lindroos | 165/94 |

Primary Examiner—Timothy F. Simone
Attorney, Agent, or Firm—Salter & Michaelson

[57] ABSTRACT

A device for tempering chocolate masses comprises a casing and a sequential series of cooling sections in the casing for cooling and working a chocolate mass to produce a stable, homogeneous chocolate product. Each of the cooling sections includes a pair of cooled upper and lower cooling surfaces and a pair of rotating upper and lower working elements which are received between the cooling surfaces therein. The working elements have helical scraping elements on the surfaces thereof which face the adjacent cooling surfaces, and the scraping elements are constructed so that as the working elements are rotated, the scraping elements on the lower working elements move chocolate outwardly along the lower cooling surfaces and the scraping elements on the upper working elements move chocolate inwardly along the upper cooling surfaces.

4 Claims, 4 Drawing Figures

DEVICE FOR TEMPERING CHOCOLATE MASSES AND THE LIKE

BACKGROUND AND SUMMARY OF THE INVENTION

The instant invention relates to devices for tempering and cooling chocolate masses and the like and more particularly to a device wherein chocolate is effectively cooled and worked as it is passed through a series of sequential cooling sections.

It is generally known that in order to effectively cool chocolate, it must be cooled in a tempering process which induces the formation of stable $\beta$ crystals in the chocolate. In this connection, although tempering devices have been heretofore available for cooling and working chocolate in a plurality of sequential cooling steps to produce suitably-cooled chocolate products, the heretofore available devices have generally required large numbers of cooling steps; and as a result, they have generally been highly expensive.

The instant invention provides a highly effective device for cooling a chocolate mass in a plurality of cooling steps, wherein highly effective mass flow and heat transfer is achieved in each cooling step, and wherein a high percentage of the chocolate is formed into $\beta$ crystals as it is cooled. However, the device of the instant invention is also adapted to be made in relatively inexpensive constructions since it can be made with substantially fewer cooling sections than the heretofore available devices for cooling and tempering chocolate. More specifically, the device of the instant invention comprises a casing having an inlet adjacent the lower end thereof and an outlet adjacent the upper end thereof, and a series of cooling sections in the casing through which chocolate passes as it flows from the inlet of the casing to the outlet thereof. Each of the cooling sections comprises a pair of opposed, cooled upper and lower cooling surfaces which are defined by cooling elements in the casing and which are positioned so that they cooperate to define a cooling chamber therebetween, and a pair of rotating concentric upper and lower working elements in the cooling chamber. Each pair of working elements and the respective cooling chamber in which they are received are constructed so that chocolate enters the chamber adjacent the hub of the lower working element and passes outwardly between the lower working element and the lower cooling surface and then inwardly between the upper working element and the upper cooling surface toward the hub of the upper working element. Each of the working elements preferably comprises a disc portion and at least four helical scraping elements on the side thereof which faces the adjacent cooling surface. Further, the helical scraping elements are preferably constructed and oriented so that as the working elements in a chamber are rotated, the helical scraping elements on the lower working element move chocolate outwardly, whereas the helical scraping elements on the upper working element in the same chamber move chocolate inwardly. Still further, the working elements preferably each further comprise at least four substantially radially extending mixing elements on the side thereof which is opposite from the scraping elements thereon and which therefore faces the adajcent working element, and the mixing elements on adjacent working elements are preferably disposed at angles of approximately 45° with respect to each other. Even further, the disc portions of the working elements are preferably formed with outlets or notches along the outer peripheral edges thereof which allow chocolate to be transferred from the area between the lower working element and the lower cooling surface to the area between the upper working element and the upper cooling surface.

Accordingly, it is a primary object of the instant invention to provide an improved device for cooling chocolate.

Another object of the instant invention is to provide an economical device for effectively tempering and cooling chocolate.

An even further object of the instant invention is to provide a device for cooling chocolate, wherein chocolate is moved outwardly by helical scraping elements on a working element disc and then moved inwardly by helical scraping elements on another working element disc.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE INVENTION

Figure 1:
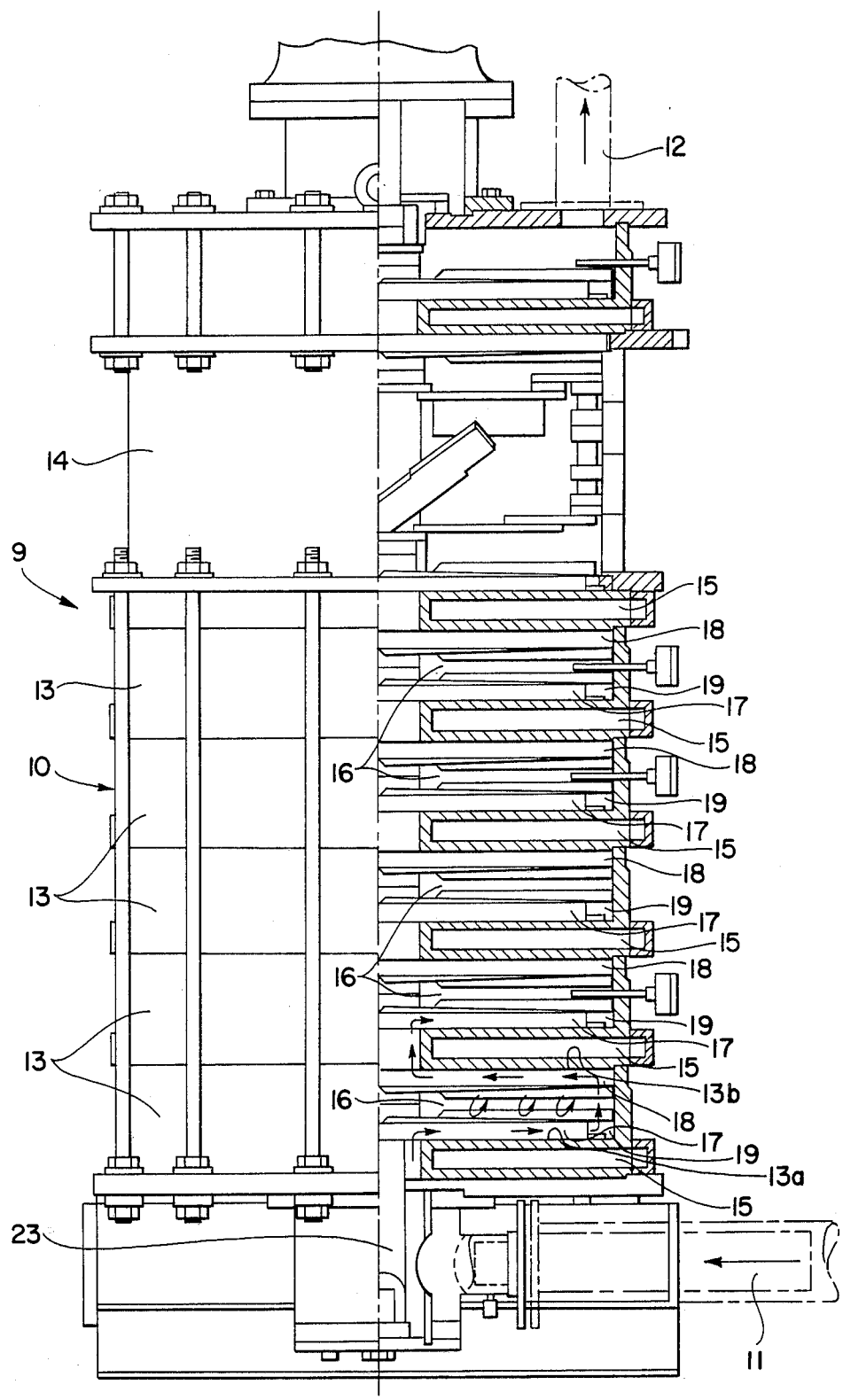
FIG. 1 is a front elevational view of the device of the instant invention in partial section.

Referring now to the drawings, the device of the instant invention is illustrated in FIG. 1 and generally indicated at 9, and it comprises a casing 10 having an inlet 11 adjacent the lower end thereof, and an outlet 12 adjacent the upper end thereof, a plurality of cooling sections 13, and a homogenizing section 14. For use and operation of the device 9, a liquid chocolate mass is fed into the inlet 11 so that it passes through each of the cooling sections 13 and thereafter passes through the homogenizing section 14 and out the outlet 12.

The cooling sections 13 each comprise a pair of lower and upper substantially planar cooling surfaces 13(a) and 13(b) which are defined by cooling elements 15 in the casing 10 and which cooperate to define a cooling chamber therebetween. The cooling elements 15 are preferably cooled by suitable means, such as by circulating water therethrough, and they extend inwardly in the casing 10 and terminate in spaced relation to the shaft 23 so that they provide passages for chocolate to pass from one cooling section 13 to the next cooling section 13. The cooling elements 15, except the uppermost and lowermost cooling elements 15, are positioned in the casing 10 so that they each define the upper cooling surface 13(b) of one cooling section 13 and the lower cooling surface 13(a) of the next sequential cooling section 13. Each of the cooling sections 13 further comprises a pair of lower and upper working elements 17 and 18, respectively, which are mounted on a rotating shaft 23 so that they rotate in their respective cooling chamber defined by the respective cooling surfaces 13(a) and 13(b) thereof.

Figure 2:
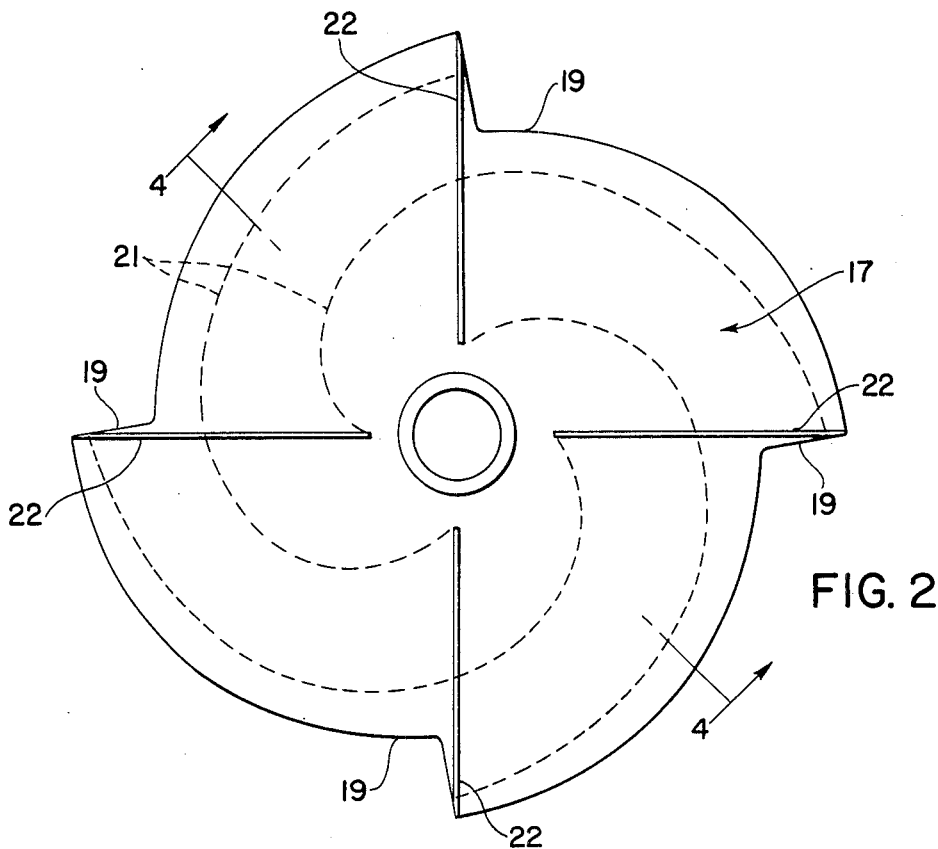
FIG. 2 is a top plan view of one of the lower working elements of the device.
Figure 4:
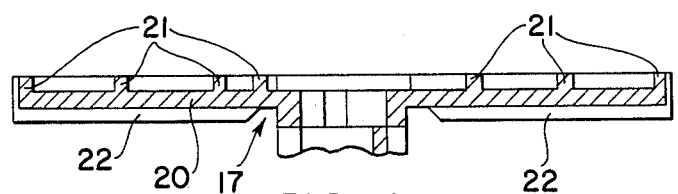
FIG. 4 is a sectional view taken along line 4—4 in FIG. 2.
Figure 3:
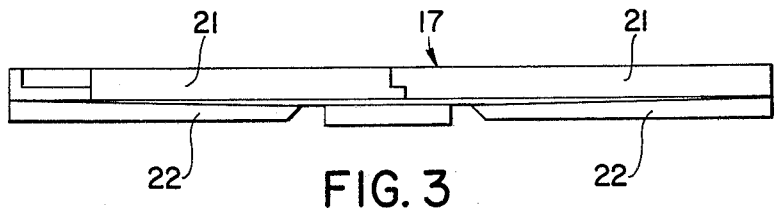
FIG. 3 is a side elevational view thereof.

Referring now to FIGS. 2 through 4, one of the lower working elements 17 is illustrated. Each of the working elements 17 comprises a disc-shaped wheel disc 20 having a plurality of helical scraping elements 21 on one side thereof and a plurality of substantially radially extending mixing elements on the opposite side thereof, and each of the discs 20 is formed with a plurality of notches or outlets 19 along the perimeter thereof. Each of the working elements 17 preferably has at least four of the helical scraping elements 21 thereon, and it preferably also has at least four of the mixing elements 22 thereon. The working elements 18 are preferably of substantially the same configuration as the working elements 17, and the pairs of working elements 17 and 18 are positioned in their respective cooling sections 13 so that the mixing elements 22 of the pairs of working elements 17 and 18 face each other and so that the helical scraping elements 21 of the pairs of working elements 17 and 18 face in opposite directions. In this connection, although the working elements 17 and 18 in each cooling section 13 rotate together, the mixing elements 22 nevertheless provide additional mixing of chocolate which is positioned between the working elements 17 and 18 of the cooling sections 13. In any event, the lower and upper working elements 17 and 18, respectively, of each cooling section 13 are positioned so that the helical scraping elements 21 of the working elements 17 and 18 face their respective adjacent lower and upper cooling surfaces 13(a) and 13(b) to move chocolate outwardly along the surfaces 13(a and then inwardly along the surfaces 13(b).

The homogenizing section 14 is optional and may or may not be included with the device of the instant invention. In this connection, the homogenizing section 14 is operative for agitating and/or reheating chocolate from the last cooling section 13, but in and of itself the homogenizing section 14 forms no part of the device of the instant invention.

For use and operation of the device 9, a melted chocolate mass is introduced into the casing 10 through the inlet 11 so that it passes into the lowermost cooling section 13. As the chocolate enters the inner chamber of the lowermost cooling section 13, it passes between the lower working element 17 thereof and the lower cooling surface 13(a) thereof, so that it is moved outwardly by the helical scraping elements 21 on the lower working element 17 as the lower working element 17 is rotated. As the chocolate is moved outwardly, it passes along the adjacent lower cooling surface 13(a); and when it reaches the outer peripheral portions of the lower working element 17, it passes through the outlets 19 thereon and then through the outlets 19 on the adjacent upper working element 18. The helical scraping elements 21 of the upper working element 18 face upwardly; and as a result, as the upper working element 18 is rotated by the shaft 23, chocolate passes inwardly along the upper cooling surface 13(b) toward the hub of the upper working element 18 until it can pass between the inner end of the adjacent cooling element 15 to the next sequential cooling section 13. Accordingly, the chocolate passes sequentially through all of the cooling sections 13 in this manner, and it is effectively cooled as it is moved outwardly and then drawn inwardly along the cooling surfaces 13(a) and 13(b), respectively, of the cooling sections 13.

It has been found that the device of the instant invention can effectively cool chocolat masses in a manner which produces stable $\beta$ crystals and further that the device of the instant invention is adapted for relative inexpensive constructions since it includes only a limited number of cooling sections 13. Accordingly, it is seen that the device of the instant invention represents a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A device for tempering chocolate masses and the like comprising a casing having upper and lower ends, having an inlet adjacent the lower end thereof and an outlet adjacent the upper end thereof, and a sequential series of cooling sections in said casing, each of said cooling sections comprising a pair of cooled upper and lower cooling surfaces which cooperate to define a cooling chamber therebetween and a pair of rotating concentric upper and lower working elements in the respective cooling chamber thereof, each of said working elements comprising a central hub, a disc portion which extends outwardly from the central hub thereof and a plurality of helical scraping elements on one side of the disc portion thereof, the upper and lower working elements of each cooling section being positioned so that the scraping elements thereof intimately engage the adjacent upper and lower cooling surfaces, respectively, thereof and being constructed so that chocolate enters each of said chambers adjacent the hub of the lower working element thereof, is moved outwardly between the lower working element and the lower cooling surface thereof by the scraping elements on the lower working element thereof, and is then drawn inwardly between the upper working element and the upper cooling surface thereof toward the hub of the upper working element by the scraping elements on the upper working element thereof.

2. The device of claim 1 further comprising at least four of said helical scraping elements.

3. In the device of claim 1, each of said working elements further comprising a plurality of mixing elements on the side thereof opposite from the scraping elements thereon.

4. In the device of claim 3, each of said working elements having four mixing elements thereon, the mixing elements on the upper and lower working elements in each chamber being at angles of approximately 45° with respect to each other.

* * * * *